United States Patent
Miller

(10) Patent No.: US 6,806,908 B2
(45) Date of Patent: Oct. 19, 2004

(54) CATHODE CURRENT LIMITING CIRCUIT FOR PROJECTION TELEVISION DISPLAY SYSTEMS

(75) Inventor: William G. Miller, Knoxville, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 518 days.

(21) Appl. No.: 09/927,211

(22) Filed: Aug. 10, 2001

(65) Prior Publication Data

US 2003/0030726 A1 Feb. 13, 2003

(51) Int. Cl.$^7$ ................................................ H04N 9/20
(52) U.S. Cl. ...................................... 348/380; 348/380
(58) Field of Search ................................ 348/380, 377, 348/379, 382, 655, 657, 184, 189, 805, 778, 327; 315/379, 381, 382.1, 383, 387; 345/10, 11, 22

(56) References Cited

U.S. PATENT DOCUMENTS

| | | | | |
|---|---|---|---|---|
| 4,253,110 A | * | 2/1981 | Harwood et al. | 348/380 |
| 4,253,121 A | * | 2/1981 | Avery | 348/380 |
| 4,259,691 A | * | 3/1981 | Monahan et al. | 348/327 |
| 4,370,674 A | * | 1/1983 | Johnson et al. | 348/380 |
| 4,387,390 A | * | 6/1983 | Reneau et al. | 348/380 |
| 4,450,476 A | * | 5/1984 | Tallant, II | 348/379 |
| 4,516,152 A | * | 5/1985 | Willis | 348/657 |
| 4,599,643 A | * | 7/1986 | Harlan | 348/380 |
| 4,689,668 A | * | 8/1987 | Sutherland et al. | 348/380 |
| 5,177,413 A | * | 1/1993 | Wilber | 315/383 |
| 5,191,420 A | * | 3/1993 | Lagoni et al. | 348/687 |
| 5,313,294 A | * | 5/1994 | Haferl | 348/377 |
| 5,892,544 A | * | 4/1999 | Ikegami et al. | 348/380 |
| 5,894,327 A | * | 4/1999 | Griepentrog | 348/379 |
| 6,008,842 A | * | 12/1999 | Nagata | 348/173 |
| 6,097,445 A | * | 8/2000 | Goto et al. | 348/655 |
| 6,285,401 B1 | * | 9/2001 | Griepentrog | 348/380 |

OTHER PUBLICATIONS

*Television Engineering Handbook*, K. Blair Benson, Sect. 13.13.9, pp. 13.146–13.148 (1986).

* cited by examiner

Primary Examiner—Michael H. Lee
Assistant Examiner—Paulos Natnael
(74) Attorney, Agent, or Firm—Edward W. Goodman

(57) ABSTRACT

A cathode current limiting circuit and method, for use with projection color television display systems to prevent overheating and possible cracking of the blue cathode ray tube (CRT) when a continuous blue background is presented, monitors differences between the respective low level red, green, blue (RGB) signals sent from the video signal processor to the CRT drive which produces the respective RGB cathode or beam currents. When the low level blue signal exceeds both of the red and the green signals by a predetermined differential, the circuit sends a feedback signal to the video signal processor to limit the blue signal and, thus, the cathode current from the CRT drive.

19 Claims, 1 Drawing Sheet

CATHODE CURRENT LIMITING CIRCUIT FOR PROJECTION TELEVISION DISPLAY SYSTEMS

BACKGROUND OF THE INVENTION

Field of the Invention

The present invention is directed generally towards cathode current limiting circuits for video displays, and more particularly, towards a cathode current limiting circuit for projection television display systems which monitors differences between low level red, green and blue signals to provide cathode current limiting feedback to the video signal processor.

DESCRIPTION OF THE RELATED ART

A projection television display system includes three individual cathode ray tubes (CRTs), each having a different screen phosphor corresponding to one of red, green, and blue (RGB) colors. Each CRT emits a respective RGB light image responsive to a received television signal of the system, these light images being reflected from a mirror and merged onto the rear of an opaque screen for viewing as a single full color image. High level RGB video drive signals are coupled to respective cathodes of the electron guns of the CRTs from respective drive amplifiers or "drivers" which amplify the respective low level RGB video signals produced by a video signal processor. In response to the respective video drive signals, the CRTs generate electron beams at a cathode or beam current, these beams striking the respective screen phosphors within the CRT causing them to emit light outputs of particular wavelengths corresponding to the respective color emitted by the CRT. The light outputs produced by the CRTs are transmitted by an optical system to a screen where a composite color image is reproduced.

In such projection television display systems, having the three separate CRTs for producing RGB light, certain signals, such as a high level flat field in an individual primary color, can result in that a respective CRT provides much more than its nominal share of light. Unfortunately, many video accessory devices, such as video games, cable television, etc., provide a blue flat field when no program content is being provided. While it is common practice to sense and limit the total beam current under such flat field conditions, one CRT may draw most if not all of the beam current ordinarily allocated for all three CRTs. This one CRT may then overheat and fracture if these conditions are allowed to remain continuously.

Typically, the share of the total cathode current drawn by all of the CRTs relative to that drawn by each individual CRT is determined by directly measuring the cathode ray current of each individual CRT. The overall cathode current is then controlled by feedback to control the gains of the RGB video signals thus limiting the maximum average cathode current in an individual electron gun of the respective CRT to a desired level. For example, the PHILIPS MAGNAVOX Model GR-9D projection television display system directly measures the cathode current of the blue CRT. The gains of the RGB video signals are controlled in a feedback loop to limit the average blue cathode current to a safe level. However, the system requires the use of costly high voltage transistors as current sampling devices to directly sample the individual cathode currents, and furthermore introduces additional circuit complexity if the current sampling devices must also serve in an AKB stabilization loop.

SUMMARY OF THE INVENTION

In accordance with the present invention, there is provided a cathode current limiting circuit and method of use with a projection color television display system. The display system is generally of the type having a video signal processor which feeds respective low level red, green, blue (RGB) signals to a cathode ray tube (CRT) drive which amplifies the low level RGB signals to high level RGB signals which drive separate RGB cathode ray tubes producing respective RGB beam currents. The circuit comprises a sensing, i.e., switching, device having inputs for receiving the respective low level RGB signals being fed from the video signal processor to the CRT drive. The sensing device is adapted to monitor differences between the low level RGB signals and to produce an output signal at an output thereof when one of the RGB signals exceeds each of the other individual RGB signals. The output signal provides feedback to the video signal processor to adjust the low level RGB signals to limit the cathode beam current of the CRT having the highest level RGB signal.

The method of limiting the cathode current comprises the steps of 1) providing a cathode current limiting circuit of the type described above; 2) monitoring differences between the respective low level RGB signals being fed from the video signal processor to the CRT drive using the cathode current limiting circuit; and 3) producing an output signal using the cathode current limiting circuit when one of the RGB signals exceeds each of the other individual RGB signals, which signal provides feedback to the video processor to adjust the low level RGB signals to limit the cathode beam current of the CRT having the highest level RGB signal.

BRIEF DESCRIPTION OF THE DRAWING

A more complete understanding of the present invention may be obtained from consideration of the following description in conjunction with the drawings in which.

DETAILED DESCRIPTION OF THE INVENTION

Figure 1:
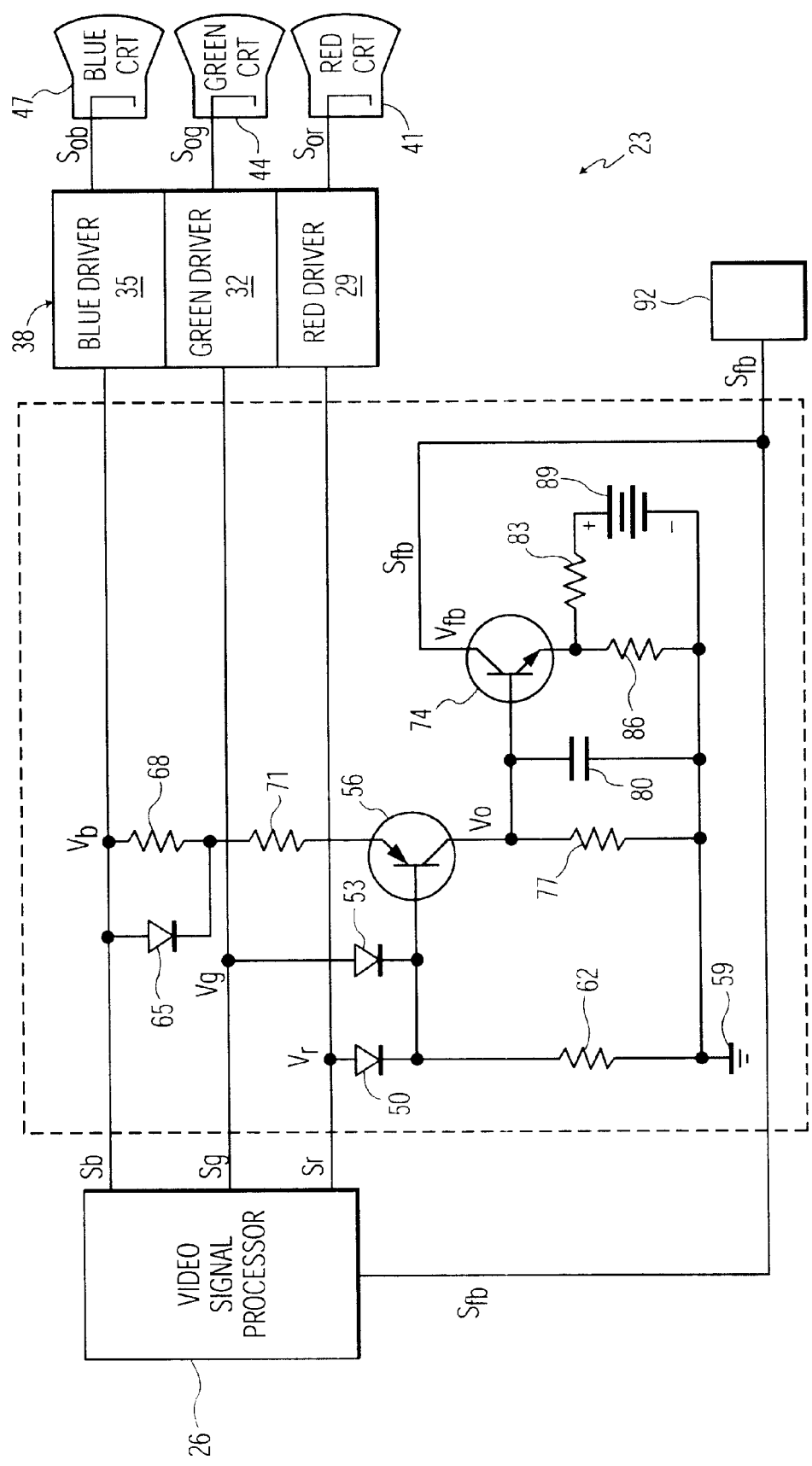
FIG. 1 shows an exemplary embodiment of a cathode current limiting circuit according to the present invention for providing feedback in a projection television display system.

Referring to FIG. 1, therein is shown an exemplary embodiment of a cathode current limiting circuit 20 according to the present invention in a projection television color video system 23. The cathode current limiting circuit 20 monitors differences between the low level red, green, and blue signals Sr, Sg, and Sb from a video signal processor 26 to respective red, green, and blue drivers 29, 32, and 35 of a CRT drive 38 of the video system 23. The cathode current limiting circuit 20 provides cathode current limiting feedback to the video signal processor 26 which limits the low level RGB signal(s) accordingly, which, in turn, limits the RGB cathode currents of the respective RGB drivers 29, 32, and 35 delivered to respective red, green, and blue CRTs 41, 44, and 47 of the video system 23.

In the exemplary embodiment shown, the separate RGB low level video signals, measured as respective RGB voltages $V_r$, $V_g$ and $V_b$, are connected from the video signal processor 26 to the individual CRT drivers 29, 32, and 35 of the CRT drive 38 for amplification to high level RGB video signals having cathode currents sufficient to drive the respective CRTs 41, 44, and 47. The low level green and red video signals are also fed through respective diodes 50 and 53 to the base of a PNP transistor 56. The base of the transistor 56 is also connected to a signal ground 59 through a resistor 62. The low level blue video signal is fed to the emitter of the transistor 56 through a parallel diode 65 and resistor 68, which are arranged in series with a resistor 71. The collector of the transistor 56 is connected to the base of an NPN transistor 74, and to a resistor 77 and 80 arranged in parallel connected to ground 59. The emitter of the transistor 74 is connected intermediate a pair of resistors 83 and 86 arranged in series interconnecting a respective positive (+) and negative (−) bias voltage, shown as a battery 89. The positive (+) output of the battery 89 is connected, through the resistor 83, to the emitter of the transistor 56, which is connected, through the resistor 86, to the negative output (−) of the battery 89 and to ground 59. The collector of the transistor 74 is connected to the video signal processor 26 as a feedback signal $S_{fb}$, which can also be input to one or more other feedback signal receiving devices 92. The cathode current limiting circuit 20 monitors the differences between the low level RGB video signals as RGB voltages $V_r$, $V_g$ and $V_b$, and predicts when the cathode current of one of the three CRTS, the blue CRT 47 in the illustrated embodiment, can be expected to significantly exceed more than its nominal one-third share of the total cathode current. The feedback signal $S_{fb}$, in the form of a feedback voltage $V_{fb}$, generates a feedback current to the video processor 26 to signal the voltage drive of the low level RGB video signals $V_b$, $V_g$ and $V_b$, accordingly, such that the appropriate high level RGB cathode current is delivered to the respective cathode guns of the RGB CRTs 41, 44, and 47. This limits the respective RGB beam currents to an acceptable level so as to not overheat the cathode guns or cause emission of x-rays by exceeding the x-ray threshold beam current level.

The cathode current limiting circuit 20 operates as follows. The low level RGB input voltages $V_r$, $V_g$ and $V_b$ each have nominally the same direct current (DC) and black/white (B-W) levels. The red and green input voltages $V_r$ and $V_g$ are applied to the base of the transistor 56 through the diodes 50 and 53, which prevent the reverse flow of current to the lesser of $V_r$ and $V_g$. The blue input voltage $V_b$ is applied to the emitter of the transistor 56, which is initially non-conductive, therefore, there being no appreciable voltage drop across the diode 65, and the resistors 68 and 71 since there is no appreciable current flow therethrough. The non-linear resistor-diode network 65, 68 and 71 coupled to the emitter of the PNP transistor 56, causes the collector current of transistor 56 to be more accurately representative of the blue cathode current than the use of a single resistor. The final cathode current is exponentially related to the cathode drive voltage by the equation $I_{cathode} = k (V_{drive})^{2.5}$.

Transistor 56 does not conduct until the level of the blue input voltage $V_b$ is greater than each of the red and the green input voltages $V_r$ and $V_g$, at which time, the transistor 56 conducts to supply an output voltage Vo at the collector thereof (i.e., Vo=voltage across the resistor 77 and the capacitor 80, the opposite connections of each being grounded). The resistor 77 and the capacitor 80 function as an integrator which causes the output voltage Vo at the collector to be proportional to the average level by which the blue input voltage $V_b$ exceeds the greater of the green and red input voltage $V_g$ or $V_r$. Therefore, with the input voltages $V_r$, $V_g$ and $V_b$ representing the average low level input signals or average voltage drive levels for the red, green, and blue colors:

$$Vo = k(V_b - V_g) \text{ for } V_b > V_g > V_r$$
$$Vo = k(V_b - V_r) \text{ for } V_b > V_r > V_g$$
$$Vo = 0 \text{ for } V_b < V_g \text{ and } V_b < V_r$$

The constant k is the proportion to the average level by which the blue input voltage $V_b$ exceeds the greater of the green or red input voltage $V_g$ or $V_r$, and is primarily controlled by the resistance value of the resistor 77, with the averaging function being primarily controlled by the capacitance of the capacitor 80. The output voltage Vo is maximum when the video is displaying a one-hundred-percent blue field. The emitter of the transistor 56 is negative-biased by the battery 89 through a voltage splitter formed by the resistors 83 and 86. When the output voltage Vo at the base of the transistor 74 versus the voltage at its emitter, begins to exceed the turn-on for the transistor 74, the feedback signal $S_{fb}$, in the form of a feedback current driven by a feedback voltage $V_{fb}$ at the collector of the transistor 74, is fed back to the video processor 26 to limit the levels of the low level RGB input voltages $V_r$, $V_b$ and $V_b$ to the respective RGB drivers 29, 32, and 35 of the CRT drive 38 to have acceptable high level output signals $S_{or}$, $S_{og}$ and $S_{ob}$ to the respective red, green, and blue CRTs 41, 44, and 47. The feedback signal $S_{fb}$ may be shared with additional drive limiting devices responsive to the total average beam current, such as the feedback receiving device 92. It is noteworthy that the cathode current limiting circuit 20 is insensitive to any common mode voltage level associated with the RGB voltages $V_r$, $V_g$ and $V_b$, being sensitive only to differential voltage levels therebetween. Therefore, the cathode current limiting circuit 20 is readily adaptable to various projection television color video systems 23 wherein the respective red, green, and blue voltages $V_r$, $V_g$ and $V_b$ are different since only the differential voltage levels are measured. Further adaptability and flexibility can be attained, such as, by making resistor 77 a variable resistor to change the constant k, and by replacing the source of a fixed biasing voltage, such as the battery 89, with a variable source of biasing voltage to permit changing the point at which the feedback signal $S_{fb}$ is sent from the collector of the transistor 74 back to the video signal processor 26.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

What is claimed is:

1. A cathode current limiting circuit for use with a projection color television display having a video processor for processing received television signals and for producing low level red (R), green (G) and blue (B) signals, a cathode ray tube (CRT) drive for receiving the low level RGB signals and for producing high level RGB signals, and respective cathode ray tubes for receiving the high level RGB signals, said cathode current limiting circuit including a first sensing device comprising:

inputs for receiving said low level RGB signals;

a monitoring circuit for monitoring differences between voltages of the low level RGB signals; and an output for producing an output signal when the voltage of one of the low level RGB signals exceeds the voltage of all of the other low level RGB signals, the output signal being applied as a feedback signal to the video processor for adjusting the low level RGB signals to limit a cathode beam current of the CRT to which the high level RGB signal, corresponding to the low level RGB signal having the highest voltage, is applied.

2. The cathode current limiting circuit claimed in claim 1, wherein said first sensing device further comprises an integrator for causing the output signal to be proportional to an average level by which the voltage of one of the low level RGB signals exceeds the voltage of the greater of the other low level RGB signals.

3. The cathode current limiting circuit claimed in claim 2, wherein said cathode current limiting circuit further comprises a second sensing device coupled to receive the output signal from the first sensing device, the second sensing device monitoring the output signal of the first sensing device and producing a further output signal when the output signal of the first sensing device exceeds a predetermined value, the further output signal of the second sensing device being fed back to the video processor after the predetermined value has been exceeded to further adjust the low level RGB signals to limit the cathode beam current of the to which the high level RGB signal, corresponding to the low level RGB signal having the highest voltage, is applied.

4. The cathode current limiting circuit as claimed in claim 3, wherein the output signal is produced only when the low level blue signal exceeds each of the low level red and signals.

5. The cathode current limiting circuit as claimed in claim 1, wherein the monitoring circuit comprises a PNP transistor, the inputs comprise a base and an emitter of said PNP transistor, and the output comprises a collector of said PNP transistor, the low level RGB signals comprising respective low level red, green, and blue voltages $V_r$, $V_g$ and $V_b$, wherein two of said voltages are input to the base to be compared with a third of said voltages input to the emitter, the output signal, providing feedback to the video processor, comprising an output voltage Vo at the collector when the voltage at the emitter exceeds the voltage at the base.

6. The cathode current limiting circuit claimed in claim 5, wherein said first sensing device further comprises a pair of diodes for permitting the greater of the two low level RGB voltages $V_r$ and $V_g$ to be applied to the base of the PNP transistor.

7. The cathode current limiting circuit claimed in claim 6, wherein the base of the PNP transistor is coupled to ground potential through a resistor.

8. The cathode current limiting circuit claimed in claim 6, wherein said first sensing device further comprises a resistor for permitting a differential resistance in opposite-way current flows of the low level RGB signals to and from the emitter of the PNP transistor.

9. The cathode current limiting circuit as claimed in claim 6, wherein said first sensing device further comprises a parallel diode and resistor and another resistor in series therewith for permitting a differential resistance in opposite-way current flows of the low level RGB signals to and from the emitter of the PNP transistor.

10. The cathode current limiting circuit as claimed in claim 9, wherein the output signal is produced only when the low level blue voltage $V_b$ exceeds each of the low level red and green voltages $V_r$ and $V_g$.

11. The cathode current limiting circuit claimed in claim 5, wherein the first sensing device further comprises an integrator for causing the output signal to be proportional to an average level by which the low level RGB voltage inputted to the emitter exceeds the greater of the two low level RGB voltages inputted to the base of the PNP transistor.

12. The cathode current limiting circuit as claimed in claim 11, wherein the first sensing device further comprises an NPN transistor having a base as an input for receiving the output signal from the PNP transistor, an emitter as an input for a biasing circuit comprising a voltage source and a pair of resistors in the form of a voltage splitter, and an output comprising a collector, the NPN transistor monitoring the output signal of the PNP transistor and producing a feedback signal comprising a feedback voltage at the collector when the output signal of the PNP transistor exceeds a predetermined level, the feedback signal providing feedback to the video processor after the predetermined level has been exceeded, to adjust the low level RGB signals to limit the cathode beam current of the CRT to which the high level RGB signal, corresponding to the low level RGB signal having the highest voltage, is applied.

13. The cathode current limiting circuit as claimed in claim 12, wherein the base of the PNP transistor is coupled to a ground potential through a resistor.

14. The cathode current limiting circuit as claimed in claim 13, wherein said first sensing device comprises a parallel diode and resistor, and another resistor in series therewith permit for permitting differential resistance in opposite-way current flows of the low level RGB signals to and from the emitter of the PNP transistor.

15. The cathode current limiting circuit as claimed in claim 14, wherein the output signal is produced only when the low level blue signal exceeds each of the low level red and green signals.

16. The cathode current limiting circuit as claimed in claim 1, wherein the cathode current is exponentially related to the cathode drive voltage by the equation $I_{cathode} = k (V_{drive})^{2.5}$.

17. A method of limiting the cathode current of a projection color television display system having a video processor for processing received television signals and for producing low level red (R), green (G) and blue (B) signals, a cathode ray tube (CRT) drive for receiving the low level RGB signals and for producing high level RGB signals, and respective cathode ray tubes for receiving the high level RGB signals, said method comprising the steps of:

receiving the low level RGB signals;

monitoring differences between the low level RGB signals producing an output signal when one of the low level RGB signals exceeds each of the other low level RGB signals; and feeding back the output signal to the video processor to adjust the low level RGB signals to limit the cathode beam current of the CRT to which the high level RGB signal, corresponding to the low level RGB signal having the highest voltage, is applied.

18. The method as claimed in claim 17, wherein the step of producing an output signal when one of the low level RGB signals exceeds each of the other low level RGB signals comprises producing an output signal only when the equations $V_b > V_r$ and $V_b > V_g$ are both simultaneously satisfied.

19. The method as claimed in claim 18, wherein the the method further comprises the step:

integrating to output signal to maintain the output signal Vo proportional to the low level RGB signals according to the equations:

$$Vo = k(V_b - V_g) \text{ for } V_b > V_g > V_r$$
$$Vo = k(V_b - V_r) \text{ for } V_b > V_r > V_g$$
$$Vo = 0 \hspace{1cm} \text{for } V_b < V_g \text{ and } V_b < V_r$$

where k is a proportionality constant; monitoring differences between the output signal Vo and a biasing voltage to produce a further output signal when the output signal Vo exceeds the biasing voltage.

* * * * *